United States Patent [19]

Edwards et al.

[11] 4,000,919
[45] Jan. 4, 1977

[54] PIPE COUPLER

[76] Inventors: Francis P. Edwards; Leo F. James, both of 1111 E. 24th St., Hialeah, Fla. 33013

[22] Filed: Apr. 9, 1969

[21] Appl. No.: 814,609

[52] U.S. Cl. .............................. 285/111; 285/175; 285/340; 285/354
[51] Int. Cl.[2] ......................................... F16L 17/02
[58] Field of Search .......... 285/111, 331, 175, 340, 285/354, 386, DIG. 3

[56] References Cited

UNITED STATES PATENTS

| 2,457,648 | 12/1948 | Donner | 285/354 X |
|---|---|---|---|
| 2,458,714 | 1/1949 | Mohoney | 285/111 |
| 2,491,004 | 12/1949 | Graham | 285/340 X |
| 3,204,988 | 9/1965 | Ouderkirk et al. | 285/340 X |
| 3,272,538 | 9/1966 | Bergstrom | 285/331 |
| 3,312,483 | 4/1967 | Leadbetter et al. | 285/340 |

FOREIGN PATENTS OR APPLICATIONS

| 1,335,121 | 7/1963 | France | 285/340 |

*Primary Examiner*—Dave W. Arola
*Attorney, Agent, or Firm*—Ernest H. Schmidt

[57] ABSTRACT

A coupler for effecting hermetically sealed pipe or conduit interconnection by slip fit and without the use of tools. A coupler body member and a screw-on nut compress therebetween the outer marginal frusto-conical portion of a spring metal locking ring having arcuate segments directed angularly inwardly of the slipfit opening and defining a circle of slightly greater diameter than that of the pipe to be connected before the locking-ring is compressed in place, and slightly lesser in diameter than that of the pipe to be connected when the locking-ring is compressed in place. Pipe disconnect is accomplished by unscrewing the nut, which permits the locking ring to again assume a configuration wherein the arcuate segments define an opening of sufficiently greater diameter to permit withdrawal of the pipe.

9 Claims, 5 Drawing Figures

PIPE COUPLER

This invention relates to pipe or conduit fittings or couplings and is directed particularly to an improved form of slipfit pipe fitting or coupling having a wide range of usage both with respect to piping materials and application.

Various types of quick-connect, quick-disconnect, self-sealing pipe and conduit couplers for joining fluid or gas-conducting lines or electrical conduit are known. Such coupling devices as have heretofore been devised, however, are deficient in various respects, principally in that they require some form of tightening with a tool for connection and disconnection, in that they are bulky and, therefore, difficult to use in close quarters, and in that they are comparatively complicated in construction.

It is, accordingly, the principal object of this invention to provide a novel and improved pipe coupler wherein connection will be effected simply by slip-fitting the pipe to be connected into the coupler without the use of tools, and which at the same time will be compact, simple in structure and of great strength in relation to its size.

It is a more particular object of the invention to provide a pipe coupler of the character described including a coupler body member and a screw-on cap or nut member wherein the threading between the body member and the nut member extends along a convergent incline along the body member as in a pipe thread, and including a spring metal lock ring having a frusto-conical outer marginal portion seatable against the outer end of the body and arranged to be press-seated thereat by the screwed-in-place nut member. The lock ring is further formed with outwardly-inclined resilient, inwardly-directed annular segmental portions having arcuate inner edges adapted, when the frusto-conical outer portion is tightened in place, to bite into and lockingly engage peripheral zones of a connected pipe. To this end, the annular segmental portions, before the lock-ring is press-seated in place, define a circle the diameter of which is no less than that of the pipe to be connected; said segmental portions, when the lock-ring is press-seated in place, being deformed to define a circle the diameter of which will be less than that of the pipe to be connected. An annular interior recess within the coupler body member and behind the lock ring has embracingly fitted therein an annular gasket adapted to seat against a connected pipe to prevent leakage due to differences between internal pressure and the pressure of the surrounding atmosphere.

Still another object is to provide a pipe coupler of the above nature which is well adapted to use with a wide variety of piping materials such as, for example, plastic, steel and brass, and for application to fluid and gas-flow conduits of all kinds, whether under greater than or less than atmospheric pressure, as well as to electrical conduit piping.

Other objects, features and advantages of the invention will be apparent from the following description when read with reference to the accompanying drawings. In the drawings, wherein like reference numerals denote corresponding parts throughout the several views.

Figure 1:
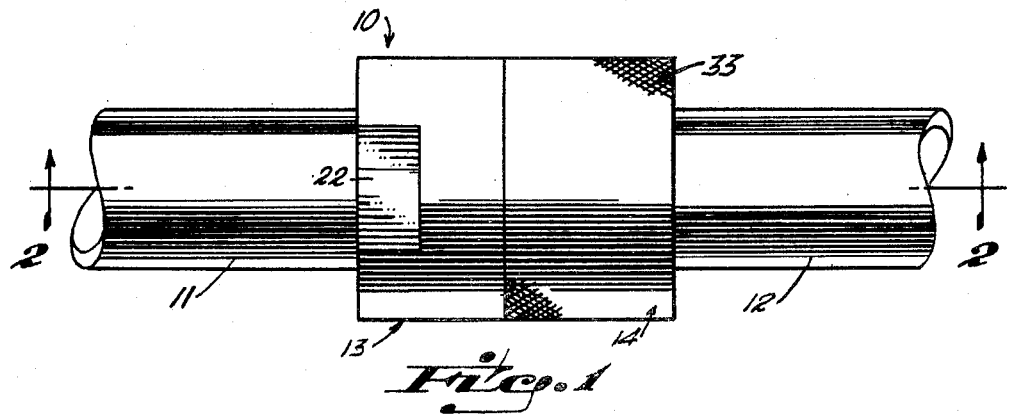
FIG. 1 is an elevational view of a pipe coupler embodying the invention, showing use in the connection of pipes (partially illustrated)
Figure 2:
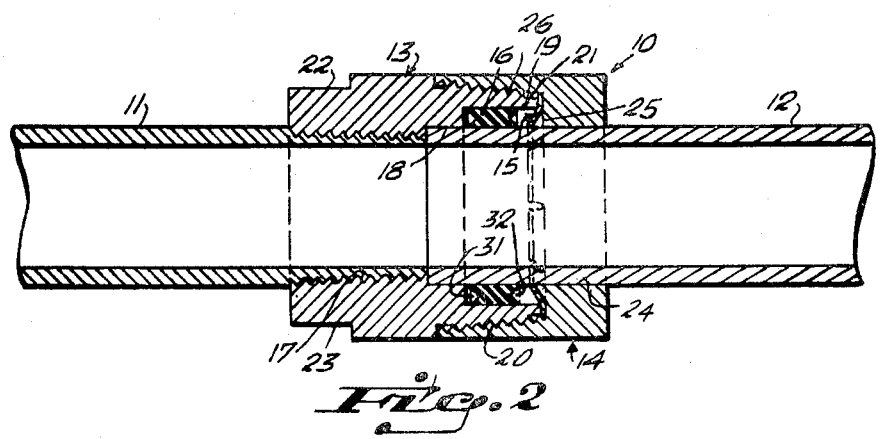
FIG. 2 is a vertical cross-sectional view taken along the length of the pipe coupling assembly shown in FIG. 1.
Figure 3:
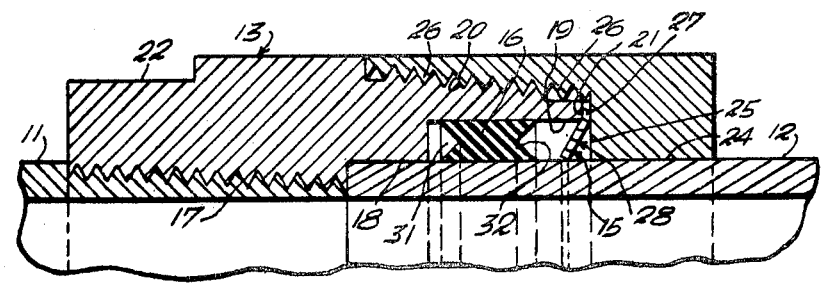
FIG. 3 is a partial illustration on an enlarged of the coupling assembly illustrated in FIG. 2, better illustrating constructional details thereof.

Referring now in detail to the drawings, the numeral 10 in FIGS. 1 through 3 designates a pipe coupler embodying the invention shown in use joining a first length of pipe or conduit 11 with a second length of pipe 12. The pipe coupler comprises, generally, a cylindrical body member 13, a cap or nut member 14, a spring metal lock ring 15 and a resilient ring gasket 16. The body member 13, which may be fabricated either of metal or of molded synthetic plastic, is formed with an axial opening which, for screw-on connection to one of the pipes to be coupled or joined, is provided at one end with an interior pipe threaded portion 17. The inner end of the threaded portion 17 opens into a first increased-diameter portion defining a first annular inner wall 18 which, in turn, extends into a second increased-diameter portion defining a second annular inner wall 19 extending through to the outer or front end of the body member 13. The front end of the body member 13, along a length substantially equal to the combined lengths of the interior wall portions 18 and 19, is formed with an external screw thread 20, somewhat convergently inclined from the inner to the outer end therealong, to terminate at an annular outer face portion 21 for the purpose hereinafter appearing. The rear or inner end of the body member 13 is preferably formed with opposed flats 20 to 23, or may alternatively be of hexagonal shape, to facilitate screwing in place on the first length of pipe 11 with the aid of a wrench.

The nut member 14, which will also preferably be formed of metal or molded of a tough, synthetic plastic material, is generally cylindrical in shape and formed at one end with an axial bore 24 of the same diameter as that of the inner wall 18 of the body member 13. The inner end of the bore 24 extends into an increased-diameter portion defining a perpendicular annular shoulder 25 which, at its outer periphery, merges into the inner end of a divergent, interior screw-threaded portion 26 complemental to the external screw thread 20 of the body member 13 and adapted to be screw-threaded thereon in assembly of the coupling.

Figure 5:
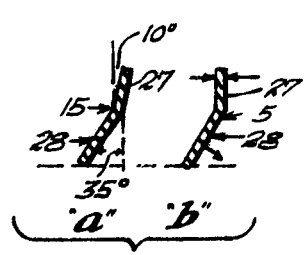
FIGS. 5a and 5b illustrate how the lock ring is deformed in use to exert its locking action on a pipe to be coupled.
Figure 4:
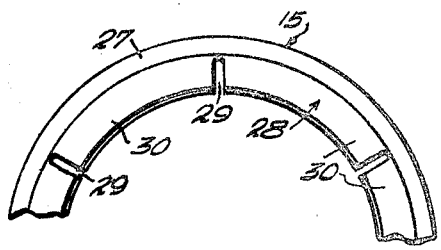
FIG. 4 illustrates, separately in partial plan view, the lock ring forming part of the coupler.

The lock ring 15, preferably of spring steel, is punch-pressed of flat stock to provide a frusto-conical outer marginal annular portion 27 integral with an angularly-offset inner portion 28. Thus, as illustrated in FIG. 5a, before being clamped in place, ashereinafter described, the outer annular portion 26 is inclined approximately 10 circular degrees with respect to a plane perpendicular to the axis of symmetry, and the inner annular portion 28 is further inclined to an angle of approximately 35 degrees. The inner portion 28 of the lock ring 15 is radially slotted, equidistantly about its periphery, as indicated at 29 in FIG. 4, to provide a plurality of equal arcuate segments 30.

The gasket 16, which is generally in the form of a flat annular ring, is preferably of rubber or Neoprene and of such external diameter as to fit embracingly within the cylindrical opening or recess in the body member 13 defined by the second annular inner wall 19 thereof. The ends of the gasket 16 are angularly recessed, as indicated at 31 and 32, to provide resilient tapered edges for the purpose hereinafter appearing.

In use, the coupling will first be assembled with the gasket in place as described above and as illustrated, and with the outer annular portion 27 of the lock ring 15 clamped in place between the annular outer face portion 21 of the body member 13 and the perpendicular shoulder 25 of the nut member 14. When so assembled it is to be noted, with reference to FIGS. 2, 3 and 5b, that the outer annular portion 27 of the lock ring will be substantially flattened by virtue of clamping pressure (indicated by the arrows in FIG. 5b) being applied to each side thereof, resulting in inward or downward deformation of the clamp segments 30, as indicated by the arrows. The inner diameter defined by the arcuate segments 30, when so deformed by the clamping action, will be less than the outer diameter of the pipe 12 to be joined, whereas the inner diameter of the opening defined by the nut bore 24, the ring gasket 16 and the body member inner wall 18 will be such as to slidingly receive the outer peripheral surface of the pipe to be joined, that is, the second pipe 12 as exemplified in the drawings. Thus, to effect pipe coupling, after first having screwed the pipe coupler on the ordinary threaded end of the first pipe 11, the second unthreaded length of pipe 12 will simply be press-fitted in place, as illustrated, the lock ring segments 30 yielding slightly to permit passage of the connected pipe. It will thus be understood that it is not necessary or even desirable to remove or loosen the nut member 14 when making a pipe connection. Once connected, the sharp inner edges of the locking segment 30, being under resilient deformation, will bite into and thus securely grip about the periphery of the attached pipe to prevent its withdrawal, while at the same time permitting relative axial movement as may be desireable in certain applications. In order to disconnect the coupling, it is only necessary to unscrew the cap member 14 sufficiently to release the pressure applied to the lock ring 15, whereupon said lock ring will return to its earlier configuration as illustrated in FIG. 5a, to release the attached pipe and permit its withdrawal. To facilitate disconnect, the outer periphery of the nut member 14 will be preferably knurled as indicated at 33 in FIG. 1.

The ring gasket 16, by virtue of its thin, resilient edges defined by the angular and recesses 31 and 32, reacts to leakage pressure, whether from the inside or the outside of the connection, to provide an effective seal even against high pressure differentials.

An important advantage of the invention, in addition to its simplicity, resides in its compactness and the ease of connection without the use of tools, whereby it is especially welladapted for use in plumbing and electrical piping in building construction to effect substantial savings in material and labor.

While there is illustrated herein, by way of example, a coupling adaptor for connection with a threaded pipe, it will also be understood that the invention is applicable as well to couplings and unions for the slip-fit joining of two lengths of unthreaded pipe, or to couplings or fittings of all classes involving the joining therewith of pipe or conduit.

What we claim is new and desire to secure by Letters Patent is:

1. A pipe coupler comprising, in combination, a body member having a first central bore for the slip-fit reception of one end of a pipe section to be connected, a nut member having a second central bore for the slip-fit through passage of pipe to be connected, means for releasably securing said nut member to one end of said body member in coaxial alignment therewith, said body member being formed, at said one end, with a (second) third bore of increased diameter with respect to said first central bore and defining an annular recess with respect thereto, a resilient locking ring having a frusto-conical outer peripheral marginal portion and an angularly-offset inner peripheral marginal portion offset in the direction of divergence of said frusto-conical outer marginal portion, said inner peripheral marginal portion being radially slotted to provide a plurality of arcuate ring segments, and means controlled by the securement of said nut member to said body member for clamping said frusto-conical outer portion of said locking-ring in a plane perpendicular to the axes of said bores, the inner edges of said segments, before said locking-ring is so clamped, defining a circle of no lesser diameter than that of said central bores, and when said locking-ring is so clamped, defining a circle of slightly lesser diameter than that of said bores.

2. A pipe coupler as defined in claim 1 wherein said locking ring segments, upon said locking ring being clamped in place, extend radially into said annular recess for free-flexing movement therein.

3. A pipe coupler as defined in claim 2 including a resilient annular gasket fitted in said annular opening.

4. A pipe coupler as defined in claim 3 wherein the opposed ends of said annular gasket are formed with V-shaped recesses to provide tapered, peripheral inner and outer edges of enhanced resiliency.

5. A pipe coupler as defined in claim 3 wherein said releasable securing means comprises an external tapered thread along said one end of said body member and coaxial with said body member bores, and a complemental internal tapered thread in said nut member and coaxial with said nut member bore.

6. A pipe coupler as defined in claim 2 wherein said locking ring clamping means comprises an outer annular surface portion at said one end of said body member, and an annular internal shoulder formed in said nut member.

7. A pipe coupler as defined in claim 6 wherein said annular surface portion and said annular shoulder portion lie in planes substantially perpendicular to the longitudinal axes of their associated bores.

8. A pipe coupler as defined in claim 6 including a resilient annular gasket fitted in said annular opening.

9. A pipe coupler as defined in claim 8 wherein said releasable securing means comprises an external tapered thread along said one end of said body member and coaxial with respect to said body member bores, and a complemental internal tapered thread in said nut member and coaxial with said nut member bore.

* * * * *